Dec. 12, 1944.   H. G. ROGERS   2,365,010
DISPLAY SCREEN FOR PICTURES AND THE LIKE
Filed June 30, 1941
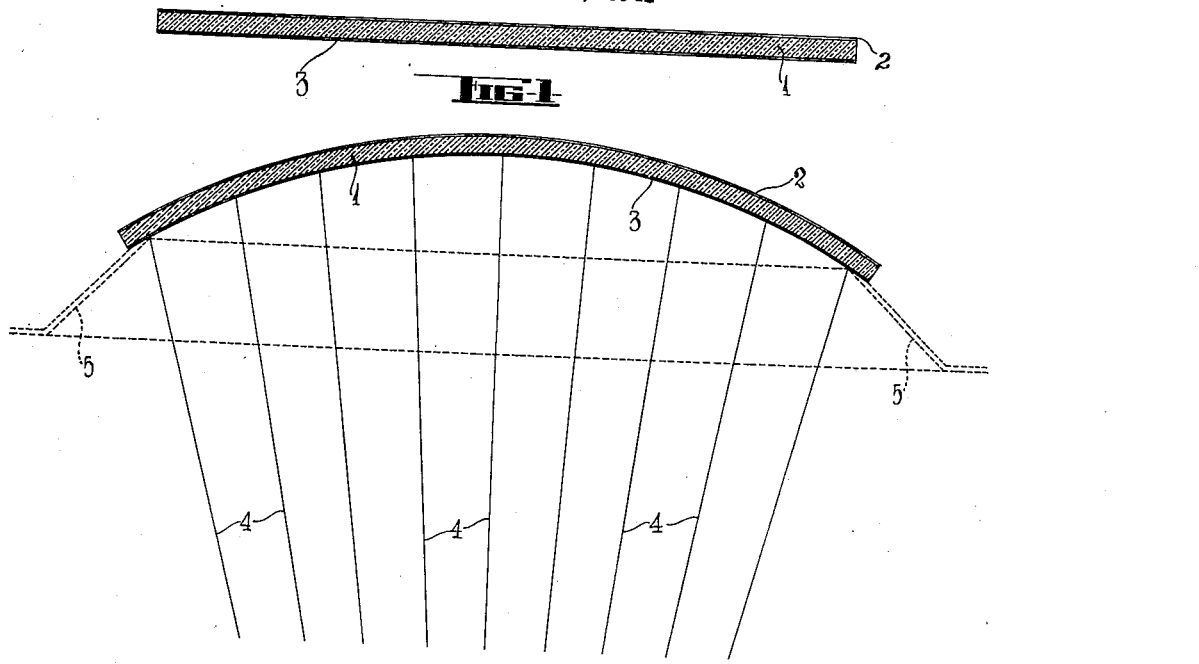
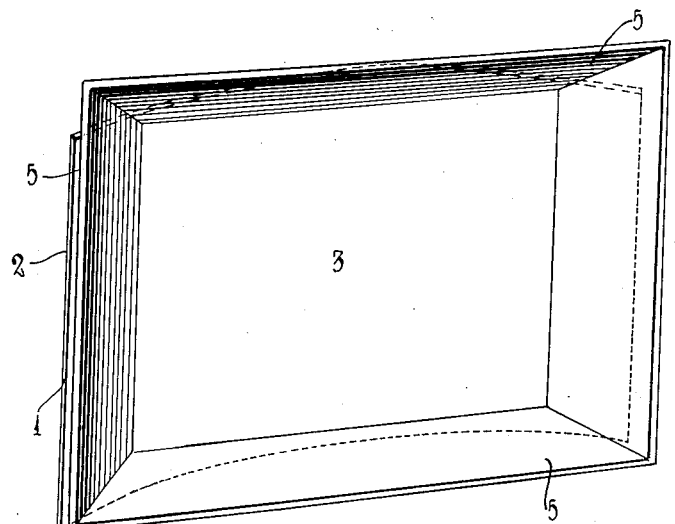
Inventor,
H. G. Rogers
By: Glascock Downing & Seebold
Attys.

Patented Dec. 12, 1944

2,365,010

UNITED STATES PATENT OFFICE 2,365,010

DISPLAY SCREEN FOR PICTURES AND THE LIKE

Harry George Rogers, Wellington, New Zealand

Application June 30, 1941, Serial No. 400,527
In New Zealand July 2, 1940

4 Claims. (Cl. 88—28.90)

The invention relates to screens upon which pictures and the like are projected for display, either as still pictures or the like, or in a manner such as to present to the observer, the illusion or appearance of motion in the matter projected or displayed.

The object of the invention is to provide an improved form of screen to be used for the aforesaid purpose, so that the picture or other matter projected or displayed upon the screen, will have the appearance or illusion of depth, in addition to possessing length and breadth.

According to the invention the improved screen comprises a thickness of transparent material, a background of dark material, and translucent material at the front of the transparent material.

Preferably, the screen is formed with a hollow curve across its front surface, the radius of said curve being equal to the width of the screen.

In the accompanying drawing in conjunction with which the invention will be more particularly described, Figure 1 is a sectional plan view illustrating the composition of the screen, and Figure 2 is a similar view showing the screen in its preferred curved form, while Figure 3 is a perspective view showing how the edges of the screen can be masked in order to increase the illusion of the viewer looking into space.

The screen is formed of transparent material 1 of suitable thickness, with a dark backing or background 2 which can be provided by applying one or more coats, thicknesses or layers of dark material such as paint, to the rear surface of the transparent material 1, or by forming and placing a suitably prepared dark backing or background against or in close proximity to the rear surface of the transparent material 1.

The transparent material 1 can be ordinary refractive glass, but preferably non-refractive transparent material such as plastic or resin glass capable of being curved, cut and otherwise worked, is used, other suitable non-refractive material can however be used.

The front surface of the transparent material 1 or that surface of the screen upon which the projected picture or other matter is displayed, is rendered or made translucent by the use of translucent material 3 in front of the transparent material 1, such as by painting or otherwise treating the surface of the transparent material 1 until the desired degree of translucency is obtained, or one or more layers or thicknesses of translucent material can be used in front of the transparent material 1.

The surface of the screen upon which the projected picture or other matter is displayed, is dished or is formed with a hollow curve extending across its width, and also if desired with a similar curve extending through its height.

The curve of the display surface, which extends through the width of the latter, forms part of a circle having as its radius, a distance equal to the width of the screen, so that the light rays 4, of the beam from the projector, are all of the same length, and strike the display surface at right angles thereto, or approximately so, thereby avoiding or reducing distortion of the matter projected on to said display surface.

Instead of using a hollow curved display surface, the latter can be flat as in an ordinary screen, with the translucent surface, transparent material and the dark background, also flat or parallel to the display surface, but otherwise formed or provided as before described.

In order to increase the illusion of the viewer looking into space, and so enhance the final effect, the side edges and the top and bottom edges of the screen can be masked or concealed by a bevelled or inclined mask 5 of suitable depth, said mask 5 being formed of dark material or having its surfaces presented to the viewer treated with dark material such as black paint.

What I do claim and desire to obtain by Letters Patent of the United States of America is:

1. An improved display screen comprising, a thickness of transparent material, a background of dark material, and a smooth unbroken coat of translucent material at the front of the transparent material disposed at right angles to a beam of light projected on said screen.

2. An improved display screen as claimed in claim 1, wherein the front surface of the screen is rendered translucent by treating same with translucent material.

3. An improved display screen, as claimed in claim 1 wherein the dark background is obtained by treating the back of the transparent material with dark material.

4. An improved display screen comprising a thickness of transparent material, a background of dark light-absorbing material, and an evenly spread unbroken coat of translucent material at the front of the transparent material, the dark and translucent materials lying in single spaced parallel planes.

HARRY GEORGE ROGERS.